United States Patent
Sheller et al.

(10) Patent No.: US 9,606,940 B2
(45) Date of Patent: Mar. 28, 2017

(54) METHODS AND APPARATUS TO UTILIZE A TRUSTED LOADER IN A TRUSTED COMPUTING ENVIRONMENT

(71) Applicant: Intel Corporation, Santa Clara, CA (US)

(72) Inventors: Micah J. Sheller, Hillsboro, OR (US); Bin Xing, Hillsboro, OR (US); Vincent R. Scarlata, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/671,222

(22) Filed: Mar. 27, 2015

(65) Prior Publication Data

US 2016/0283411 A1    Sep. 29, 2016

(51) Int. Cl.
*G06F 7/04* (2006.01)
*G06F 12/14* (2006.01)
*G06F 21/62* (2013.01)

(52) U.S. Cl.
CPC ...... *G06F 12/1458* (2013.01); *G06F 21/6218* (2013.01); *G06F 2212/1052* (2013.01)

(58) Field of Classification Search
CPC .......................... G06F 12/1458; G06F 21/6218
USPC ........................................................... 726/29
See application file for complete search history.

(56) References Cited

U.S. PATENT DOCUMENTS

| | | | |
|---|---|---|---|
| 2006/0015732 A1* | 1/2006 | Liu | G06F 21/57 713/176 |
| 2006/0074600 A1* | 4/2006 | Sastry | G06F 21/57 702/187 |
| 2008/0046752 A1* | 2/2008 | Berger | H04L 9/3271 713/186 |
| 2008/0083039 A1* | 4/2008 | Choi | G06F 21/57 726/27 |
| 2010/0117873 A1* | 5/2010 | Aciicmez | H03M 7/3086 341/51 |
| 2011/0161648 A1* | 6/2011 | Ekberg | G06F 21/575 713/2 |
| 2013/0159726 A1 | 6/2013 | McKeen | |

(Continued)

FOREIGN PATENT DOCUMENTS

| | | |
|---|---|---|
| WO | WO2010057065 | 5/2010 |
| WO | WO2011078855 | 6/2011 |

OTHER PUBLICATIONS

Anati et al., Innovation Technology for CPU Based Attestation and Sealing, 2013, Intel Corporation.*

(Continued)

*Primary Examiner* — Peter Shaw
(74) *Attorney, Agent, or Firm* — Trop, Pruner & Hu, P.C.

(57) ABSTRACT

An embodiment includes at least one machine readable medium on which is stored code that, when executed enables a system to initialize a trusted loader enclave (TL) and a measurement and storage manager enclave (MSM) within a memory of the system, to receive by the MSM a TL measurement of the TL from a trusted processor of the system, to determine whether to establish a secure channel between the MSM and the TL based at least in part on the TL measurement, and responsive to a determination to establish the secure channel, to establish the secure channel and store particular code in the TL. Additional embodiments are described and claimed.

16 Claims, 8 Drawing Sheets

(56) References Cited

U.S. PATENT DOCUMENTS

2015/0033034 A1  1/2015  Gerzon

OTHER PUBLICATIONS

Berger et al., Scalable Attestation: A Step Toward Secure and Trusted Clouds, 2015, IBM Corporation.*
Zimmer, Vincent, J., et al., "Providing a Trusted Execution Environment Using a Processor," U.S. Appl. No. 14/482,136, filed Sep. 10, 2014, 26 pages.
Martin, Anrew, "The ten-page introduction to Trusted Computing," Software Engineering Group, Oxford University, Nov. 2008, 11 pages.

* cited by examiner

US 9,606,940 B2

METHODS AND APPARATUS TO UTILIZE A TRUSTED LOADER IN A TRUSTED COMPUTING ENVIRONMENT

TECHNICAL FIELD

Embodiments pertain to trusted computing.

BACKGROUND

Secure access to data by a computational device can be an important factor regarding usefulness of the computational device in the world today. Data of a highly sensitive nature such as financial information, medical information, personal information, and the like, may need to be protected from access by malicious entities and others that do not have permission to access the data.

Therefore, manufacturers of computing equipment such as stationary computers, mobile computers including, e.g., laptops, tablets, smart phones, and other computational devices, may wish to provide robust protection against unwelcome intruders.

DETAILED DESCRIPTION

Figure 1:
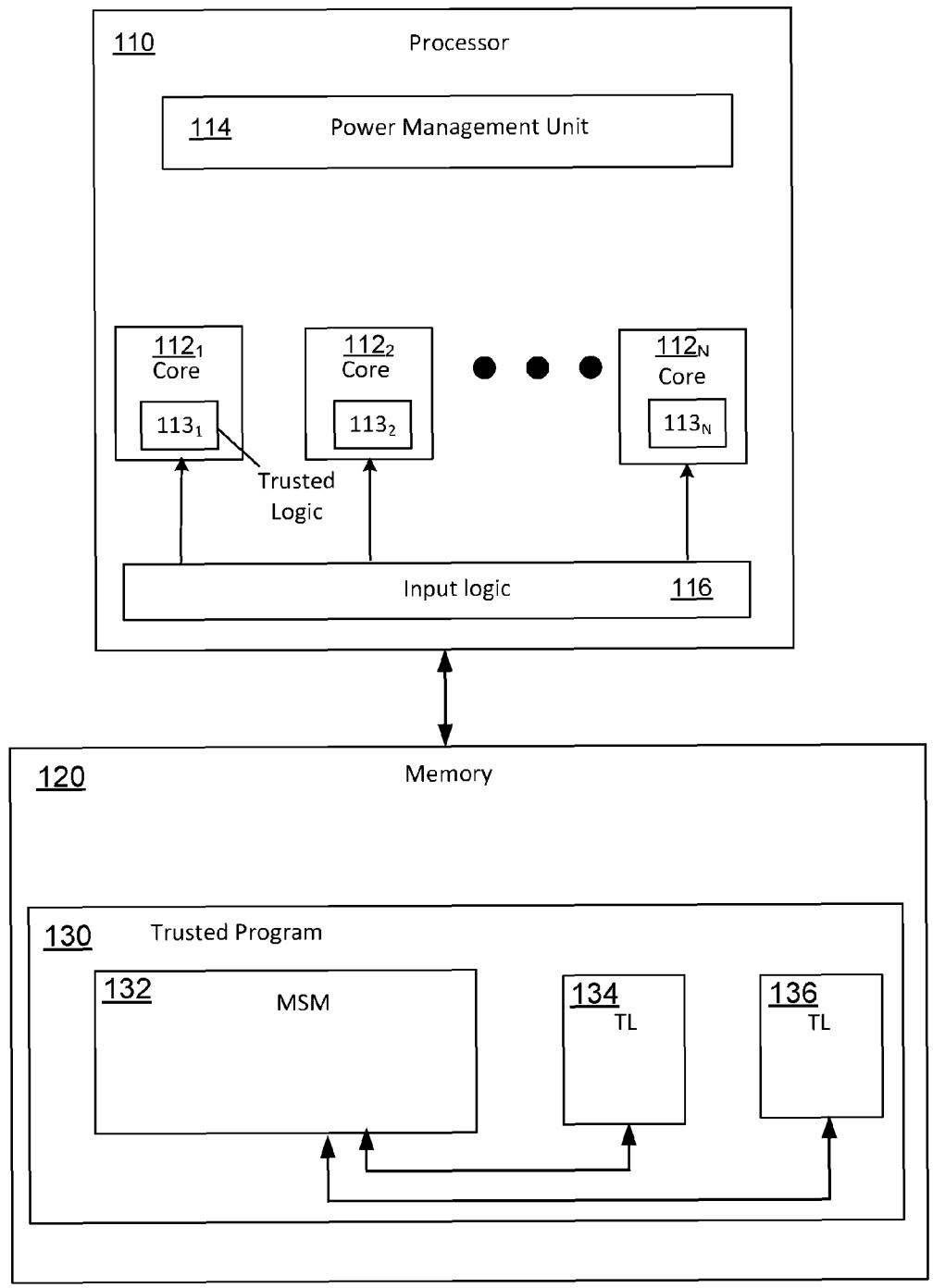
FIG. 1 is a block diagram of an apparatus, according to embodiments of the present invention.

In order to protect sensitive data against unauthorized access, a secure platform that includes one or more protected regions ("secure enclaves," "enclaves," or "trusted enclaves" herein), e.g., portions of a memory and/or processors, may be established within a computing environment. Each secure enclave may have a cryptographic signature ("signature" or "measurement" herein), e.g., a hash of contents of the secure enclave that may be determined, e.g., by a secure processor that may serve as a root of trust based on a unique encryption key, e.g., a hardware-based encryption key.

Secure enclaves within the secure platform may communicate with each other, e.g., via one or more secure links (e.g., secure channels). Entities outside of the secure platform are typically prohibited from access to data, instructions, etc. that may be stored in one or more of the secure enclaves. However, secure enclaves on different platforms can communicate via, e.g., a secure channel. That is, if a secure channel is established between a first secure enclave on a first platform and a second secure enclave on a second platform, the first secure enclave can communicate with the second secure enclave via the secure channel.

A secure enclave may be initialized, including performing a measurement, e.g., a hash of bits stored in the enclave, and the measurement may be used to authenticate the secure enclave.

After the measurement of the initialized secure enclave has been performed, it may be desirable to load additional data, or arbitrary code (e.g., an applet), into the enclave. However, since the measurement of the enclave is fixed at time of initialization, the loaded data or arbitrary code would not be represented in the measurement.

In embodiments, a trusted loader enclave (TL) may be employed. The trusted loader enclave may enable arbitrary code to be loaded into the TL after enclave initialization (e.g., after the TL measurement has been taken), and for the TL measurement and also a measurement of the arbitrary code, to be provided to a (trusted) measurement and storage management enclave (MSM) after the arbitrary code is loaded in the TL and before execution of the arbitrary code. The MSM may provide a report (further described below) based on the measurement of the arbitrary code to a recipient. The authenticity of the arbitrary code may be verified by the recipient of the report from the MSM.

In some embodiments, the TL may receive a marker (e.g., from the MSM) that binds the TL to the MSM and that identifies the TL (e.g., from among a plurality of TLs) to the MSM. The TL may be measured prior to receipt of the marker and may be measured again after the marker is received and incorporated into the TL. The MSM may determine whether to establish a secure channel with the TL based upon a comparison of a calculated (e.g., expected) measurement of the marked TL, to the measurement of the marked TL. The calculated measurement may be determined by the MSM based on the measurement of the initialized (unmarked) TL and upon the marker. If the MSM determines to establish the secure channel with the TL, cryptographic key material may be transferred from the MSM to the TL and the secure channel may be established. The MSM may store the measurement of the marked TL and the measurement of the arbitrary code (applet), both of which may be provided to a requester.

The secure channel may be established between the TL and the MSM based upon measurements of the TL and of the MSM. For example, the TL may prove the identity of the TL to the MSM via a report generated by hardware, e.g., a trusted processor or trusted portion of a processor. The hardware may use the TL measurement to generate the report that is to be encoded (e.g., a message authentication code (MAC)) with a key derived from a measurement of the MSM. The MSM can receive the encoded report, and can decode the report (e.g., with the key that the MSM derives from the measurement of the MSM) to verify that the report has not been tampered with in transit. The decoded report enables the MSM to verify the identity of the sender (e.g., TL). After verification, the secure channel may be established.

In other embodiments, the TL may be marked with a marker that identifies a set of applets that may be loaded into the TL. The TL is to refuse to load any applets not identified in the set of applets. The marked TL (e.g., TL with marker) may be initialized including measurement, by a trusted processor and a secure enclave (marked TL) may be located in memory. Measurement and storage management code may be initialized including measurement, and a management and storage management secure enclave (MSM) may be located in memory. If after initialization, the marked TL recognizes the MSM (from the measurement of the MSM) as a secure enclave with which the marked TL (secure enclave) may securely establish a secure channel, then the secure channel is established between the marked TL and the MSM.

After initialization of the marked TL, a first applet may be attempted to load into the marked TL. If the first applet is identified to be one of the applets in the set of applets (e.g., by comparison of an identifier of the first applet with the marker) then the first applet may be loaded into the marked TL, and a measurement of the first applet may be conducted. The measurement of the first applet may be transmitted and stored in the MSM, and the MSM may provide the measurement of the first applet to a requester upon request. If the first applet is not among the set of applets, loading of the first applet will be refused by the marked TL.

FIG. 1 is a block diagram of an apparatus, according to embodiments of the present invention. Apparatus 100 includes a processor 110 and a memory 120 that may include, e.g., dynamic random access memory (DRAM), non-volatile random access memory (NVRAM), or a combination thereof. The processor 110 is to include one or more cores $112_1$-$112_N$, a power management unit 114, input logic 116 that may include hardware, software, firmware or a combination thereof, and the processor 110 may include cache memory, interconnect logic, and other logics, storage, etc. (not shown). One or more of the cores $112_i$ (e.g., $112_1$, $112_2$, . . . $112_N$) may include trusted logic $113_i$ to execute secure instructions, e.g., to perform a measurement of an entity such as a trusted enclave, e.g., a cryptographic hash of contents of the trusted enclave. The trusted logic $113_i$ may include trusted (e.g., secure) hardware, and may also include trusted software, trusted firmware, or a combination thereof. The input logic 116 may receive a one or more instructions (e.g., also request, or command herein) from, e.g., an application (e.g., code stored in the memory 120), or from an operating system or another source, and the input logic 116 may direct each of the instruction(s) to one of the cores $112_i$. The memory 120 includes a trusted (e.g., secure) region 130 reserved for trusted enclaves. The trusted region 130 includes a measurement and storage enclave (MSM) 132, a trusted loader enclave (TL) 134 and a TL 136. The region may also include additional TLs (not shown), and also may include additional MSMs (not shown).

In operation, in a first embodiment, an MSM 132 may be instantiated. For example, the MSM 132 may include code, e.g., MSM instantiation code that when executed, may include a request for an MSM measurement of MSM 132. The request may be directed, via the input logic 116, to one of the cores $112_i$, which may conduct the MSM measurement. TL 134 and TL 136 may be initialized including establishment of TL 134 and TL 136 as secure enclaves and measurement of TL 134 and TL 136 by the processor 110. The measurement of MSM 132 can be received by TL 134 and TL 136, e.g., from the processor 110, in order to verify authenticity of the MSM 132.

A TL report based on the measurement of TL 134 received from, e.g., the processor 110 by the MSM 132 may be used by the MSM 132 to establish a secure channel between TL 134 and MSM 132. Responsive to authentication of MSM 132 by TL 134, cryptographic key material may be sent from MSM 132 to TL 134 in order to establish a first secure channel between TL 134 and MSM 132. Another TL report based on the measurement of TL 136 received from, e.g., the processor 110 by the MSM 132 may be used by the MSM 132 to establish a second secure channel between TL 136 and MSM 132.

Arbitrary code, e.g., an applet, may be loaded into the TL 134, which is established to be a secure enclave by initialization, and a measurement of the applet (or other arbitrary code) may be conducted by TL 134 and sent to MSM 132. MSM 132 may subsequently provide the measurement of the applet (and may also provide the TL measurement) to a third party upon request.

Thus, TL 134 in combination with the MSM 132 may enable an applet (or other arbitrary code) to be loaded into the TL 134 after initialization of TL 134 is complete. The applet may be measured by the (trusted) TL 134 and a measurement of the applet may be provided to MSM 132, which can provide the measurement of the applet to a requester.

In a second embodiment that may provide additional security against an "evil" applet, e.g., an applet attempting to present itself as if it were stored in a different TL, or to present itself to another MSM and provide a measurement associated with another applet, TL 134 may be loaded into memory 120. A marker (also mark herein) may be assigned to TL 134 by MSM 132. The marker is to enable MSM 132 to uniquely identify the TL 134, e.g., from among other TLs such as TL 136. In an embodiment, the marker may be determined based on a combination of a unique sequence number assigned to the TL 134 by the MSM 132, and a unique MSM identifier associated with the MSM 132. The sequence number may differentiate TL 134 from, e.g., TL 136 and from any other TLs within the region 130. A policy may be in place to prevent distinct TLs from having identical sequence numbers (e.g., due to "wrap around" of sequence numbers). For example, the policy may prevent more TLs than a maximum sequence number from being marked (also "tagged" herein). The marker assigned to TL 134 may bind the TL 134 to the MSM 132 (e.g., via the MSM identifier). A measurement of the marked TL 134 ("expected measurement") may be conducted by MSM 132.

The marked TL 134 may be initialized to form a secure enclave by the processor 110, initialization including a processor measurement of the TL 134 provided by the processor 110. The processor measurement of the marked TL 134 may be provided to the MSM 132 by the processor 110.

MSM 132 may conduct a comparison of the expected (MSM) measurement of TL 134 to the processor measurement of the marked TL 134. If the MSM 132 determines that the expected measurement is the same as the processor measurement of the marked TL 134, and if the marked TL 134 recognizes the measurement of the MSM 132 (available to the marked TL 134 from the processor 110), then MSM 132 can provide cryptographic key material to TL 134 in order to establish a secure channel. The cryptographic key material may be utilized to set up the secure channel between the MSM 132 and the TL 134. Additionally, a measurement of the applet (e.g., after the applet is stored into the marked TL 134) may be conducted by the marked TL 134, and the measurement of the applet may be sent to the MSM 132. Upon request, the measurement of the applet (and optionally, the measurement of the marked TL 134) may be provided to a requester.

Figure 2:
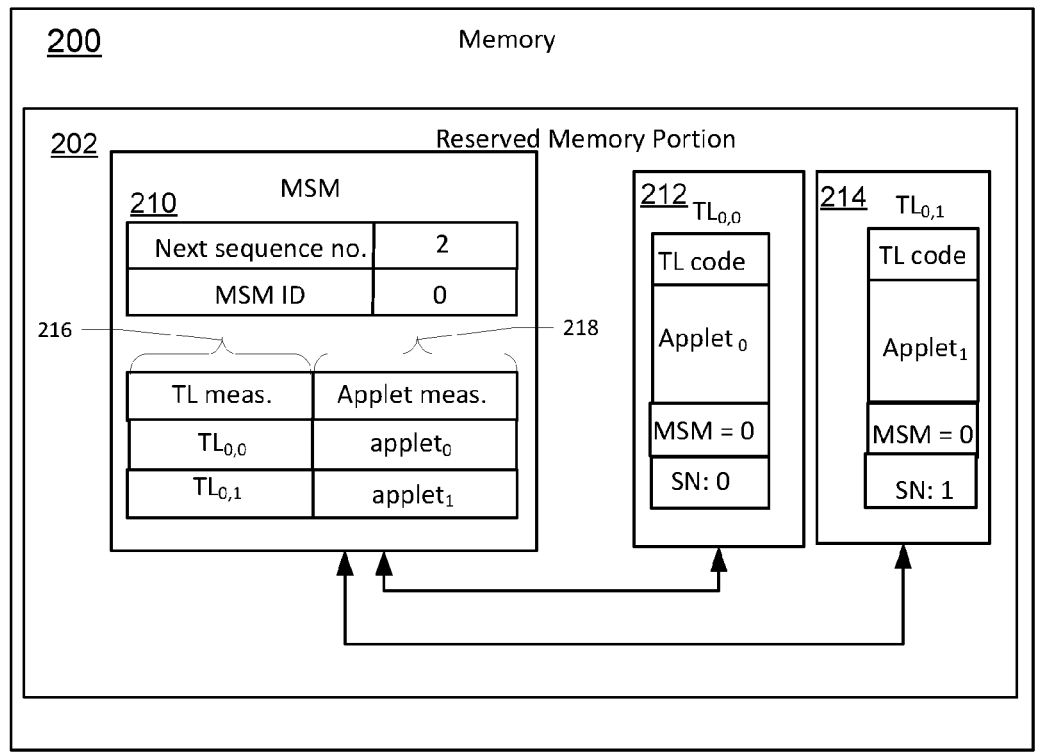
FIG. 2 is a block diagram of an apparatus, according to another embodiment of the present invention.

FIG. 2 is a block diagram of memory 200, according to an embodiment of the present invention. Memory 200 includes a reserved memory portion 202 that is reserved for secure enclaves. Within reserved memory portion 202 is measurement and storage management secure enclave (MSM) 210, trusted loader secure enclave (TL) 212, and TL 214. Each TL 212, 214, includes respective TL code. Note that other embodiments may include additional MSMs and/or additional TLs within the reserved memory portion 202 of the memory 200.

In operation, the MSM 210 may assign a corresponding marker to each of TL 212 and 214 prior to initialization, e.g., prior to establishment of TL 212 and TL 214 as secure enclaves. For example, each TL marker may be determined based on a unique identifier (e.g., sequence number) of the TL with respect to the MSM 210, and a unique MSM identifier of the MSM 210 with respect to the TL. That is, the TL identifier may be based on a sequence number SN such that the MSM 210 can distinguish one TL from other TLs (e.g., the SN may be an array index). In some embodiments, SN wrap-around (e.g., repeat of sequence numbers when a maximum value of SN is reached) may be prevented by any of several techniques, e.g., a policy that is to be chosen so that wrap-around does not occur. For example, a policy may be adopted that specifies that when the maximum value of SN is reached, no additional TLs are to receive a TL marker from the MSM 210.

The MSM identifier may identify MSM 210 uniquely from any other MSM in the secure region 202. In embodiments, the MSM identifier may be generated by a monotonic counter, or by a special instruction to be executed that is to result in a unique MSM identifier for each MSM.

For example, TL 212 may have an identifier (0,0) and the TL 214 may have identifier (0,1), where a first index (e.g., having a value of 0 for both MSM 210 and TL 212) is associated with MSM 210, and a second index (e.g. sequence number) is to indicate a particular TL of the TLs associated with MSM 210. For example, TL 212 has a marker represented by (0,0), while TL 214 has a marker represented by (0,1). Each marker is to serve as a unique identifier to indicate that TL 212, 214 are bound to MSM 210 (first portion of the mark), and each TL is distinguishable from other TLs (second portion of the mark). Note that FIG. 2 is a non-limiting example, and other embodiments may include additional (or fewer) TLs, additional MSMs, etc. within reserved memory portion 202.

The MSM 210 may be initialized by a secure processor to become a secure enclave and the secure processor may conduct a measurement of the MSM 210 as part of initialization. The MSM 210 may determine an expected measurement of marked TL 212, e.g., the MSM 210 may conduct a measurement of marked TL 212 prior to initialization of marked TL 212 (e.g., prior to establishment of TL 212 as a secure enclave). After the marker is assigned to TL 212, the marked TL 212 may be initialized, e.g., via a secure processor that establishes the marked TL 212 as a secure enclave, and a processor measurement of the marked TL 212 may be conducted by the secure processor. The processor measurement of the marked TL 212 may be provided to the MSM 210, and MSM 210 may perform a comparison of the expected measurement of the marked TL 212 to the processor measurement of the marked TL 212. If the comparison yields a match, and if the marked TL 212 recognizes the measurement of the MSM 210 as a trusted enclave with which secure communication is acceptable (e.g., via a secure channel to be established), the MSM 210 is to provide key cryptographic material to the marked TL 212 to create a secure channel between marked TL 212 and MSM 210. An $applet_0$ may be loaded into the marked TL 212, and the marked TL 212 may conduct a measurement of the applet. The measurement of the $applet_0$ may be provided to the MSM 210.

The MSM 210 is to maintain in storage, the measurement of the marked TL 212 (in column 216) and the measurement of the $applet_0$ (in column 218). Upon request, the MSM 210 may provide the measurement of the $applet_0$ to a requester and an assertion that the marked TL 212 that contains the applet is authenticated (or, alternatively may include the measurement of the marked TL 212, as authentication proof that the $applet_0$ is stored in (secure) marked TL 212). A similar procedure may be followed for TL 214 and $applet_1$.

By marking each TL with a unique marker that identifies the TL with respect to the MSM 210 and that also identifies each TL as uniquely associated with the MSM 210, an identity mix-up of the stored applet may be prevented. For example, an "evil applet" that attempts to indicate that that the evil applet resides in a different TL from the TL in which the evil applet current resides, will be discovered as providing fraudulent TL information due to the measurement of the marked TL associated with the applet.

In another example, the evil applet may not be able to provide, to a third party, a measurement of a good applet instead of the measurement of itself (the bad applet). As further protection against fraud, each TL is uniquely associated with its MSM, and a bad applet that attempts to interact with an MSM different from the MSM to which the TL is bound will be detected as committing fraudulent behavior, based upon the marker associated with the TL, because the marker includes identity information that binds the TL to a single MSM.

Figure 3:
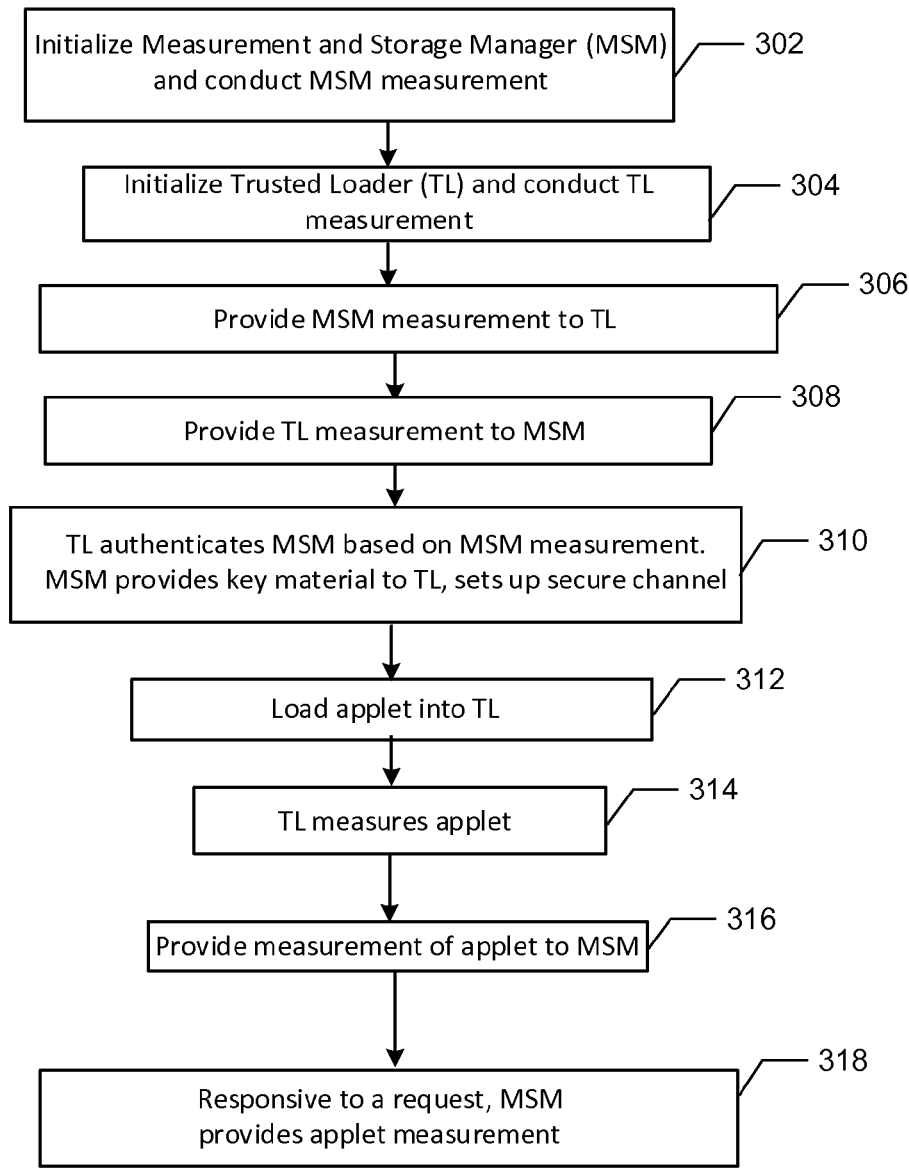
FIG. 3 is a flow diagram of a method, according to an embodiment of the present invention.

FIG. 3 is a flow diagram of a method, according to an embodiment of the present invention. Method 300 begins at block 302, where a measurement and storage manager enclave (MSM) is initialized (e.g., becomes a secure enclave) and a measurement of the MSM (MSM measurement) is conducted, e.g., by a secure processor. (For example, the MSM may be initialized through execution of a corresponding trusted instruction by trusted logic, such as trusted hardware logic within a core of a trusted processor, e.g., a processor that includes the trusted hardware logic. The trusted processor may conduct the MSM measurement.) Continuing to block 304, a trusted loader enclave (TL) is initialized, and a measurement is conducted (by the trusted processor). Moving to block 308, the MSM is to provide the MSM measurement to the TL. Continuing to block 308 the TL is to provide the TL measurement to the MSM. Advancing to block 310, the TL is to authenticate the MSM based upon the MSM measurement. The MSM is to provide cryptographic key material to the TL and the MSM is to set up a secure channel with the TL based on the cryptographic key material.

Continuing to block 312, an applet is loaded into the TL. Advancing to block 314, a measurement of the applet is conducted, e.g., by the TL. Advancing to block 316 the measurement of the applet is provided to the MSM by the TL. Moving to block 318, responsive to a request for a measurement of contents of the TL, the MSM provides the applet measurement, e.g., as proof of authenticity of the applet.

Figure 4:
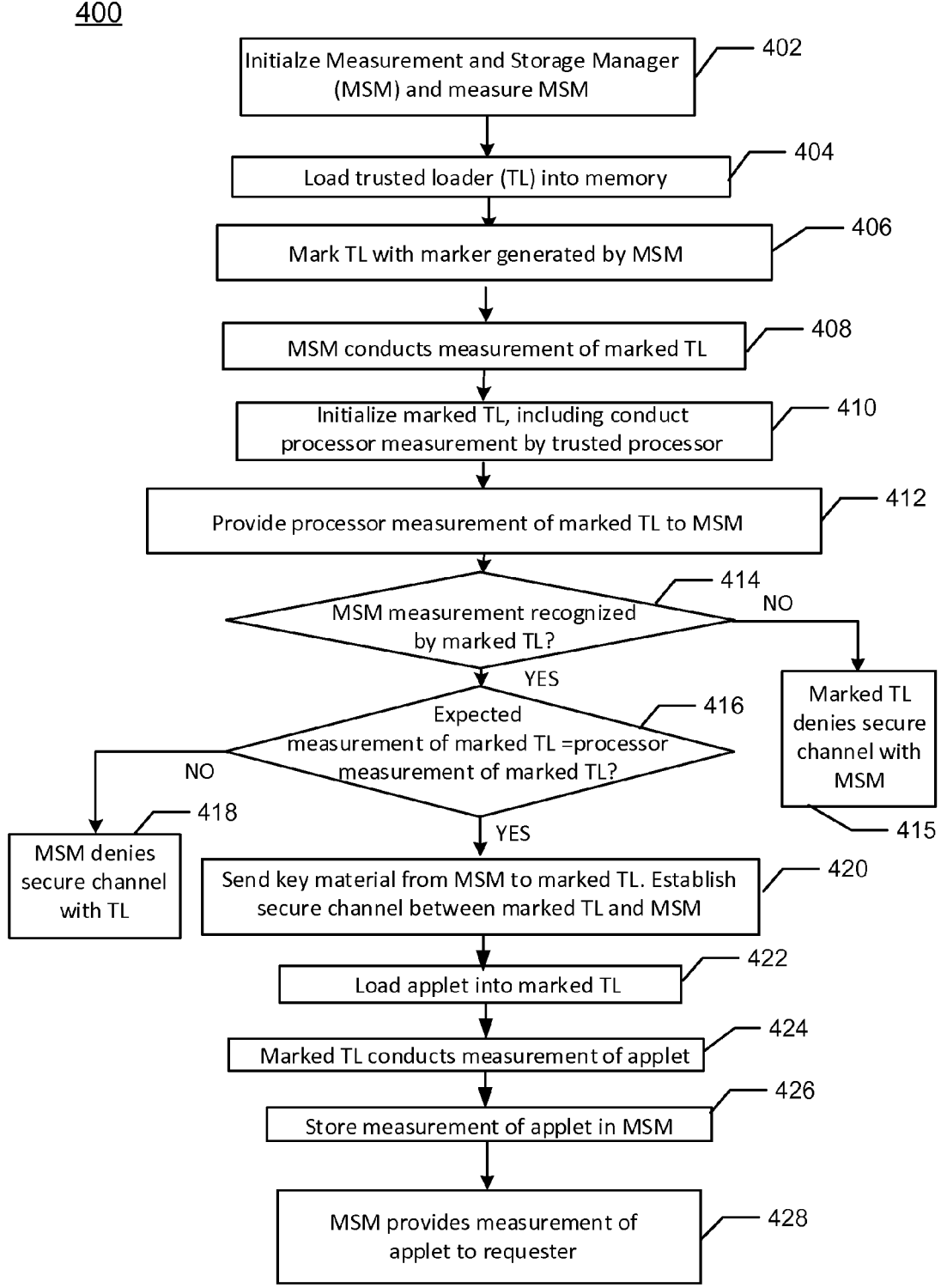
FIG. 4 is a flow diagram of a method, according to another embodiment of the present invention.

FIG. 4 is a flow diagram of a method, according to another embodiment of the present invention. Method 400 begins at block 402 with initialization of a measurement and storage manager (MSM) including measurement of the MSM, e.g., through execution of one or more secure instructions by trusted logic that is to include trusted hardware and may include trusted software, trusted firmware, or a combination thereof, within a trusted processor. Continuing to block 404, a trusted loader enclave (TL) is loaded into memory. Advancing to block 406, TL is marked with a marker generated by MSM to (uniquely) identify the TL from among other TLs.

Advancing to block 408, the MSM conducts a measurement of the TL ("expected measurement of the marked TL"). Moving to block 410, the trusted processor initializes the marked TL, including conducting a processor measurement of the marked TL. Moving to block 412, the processor measurement of the marked TL is provided to the MSM.

Proceeding to decision block 414, if the marked TL, now a secure enclave, does not recognize the MSM measurement, continuing to block 415 the marked TL denies establishment of a secure channel with the MSM. If the marked TL recognizes the MSM measurement as associated with a secure enclave with which it is to communicate, continuing to decision diamond 416 the MSM performs a comparison of the expected measurement of the marked TL to the processor measurement of the marked TL. If the expected measurement of the marked TL and the processor measurement of the marked TL do not match, continuing to block 418 the MSM denies establishment of a secure channel with the TL. If the comparison shows a match, advancing to block 420 cryptographic key material is to be sent from the MSM to the marked TL, and a secure channel is to be established between the marked TL and the MSM.

Moving to block 422, an applet is loaded into the marked TL. Proceeding to block 424, the marked TL conducts a measurement of the applet. Continuing to block 426, the measurement of the applet is sent to the MSM and is stored in the MSM. Advancing to block 428, the MSM is to provide the measurement of the applet to a requester (e.g., third party).

Figure 5:
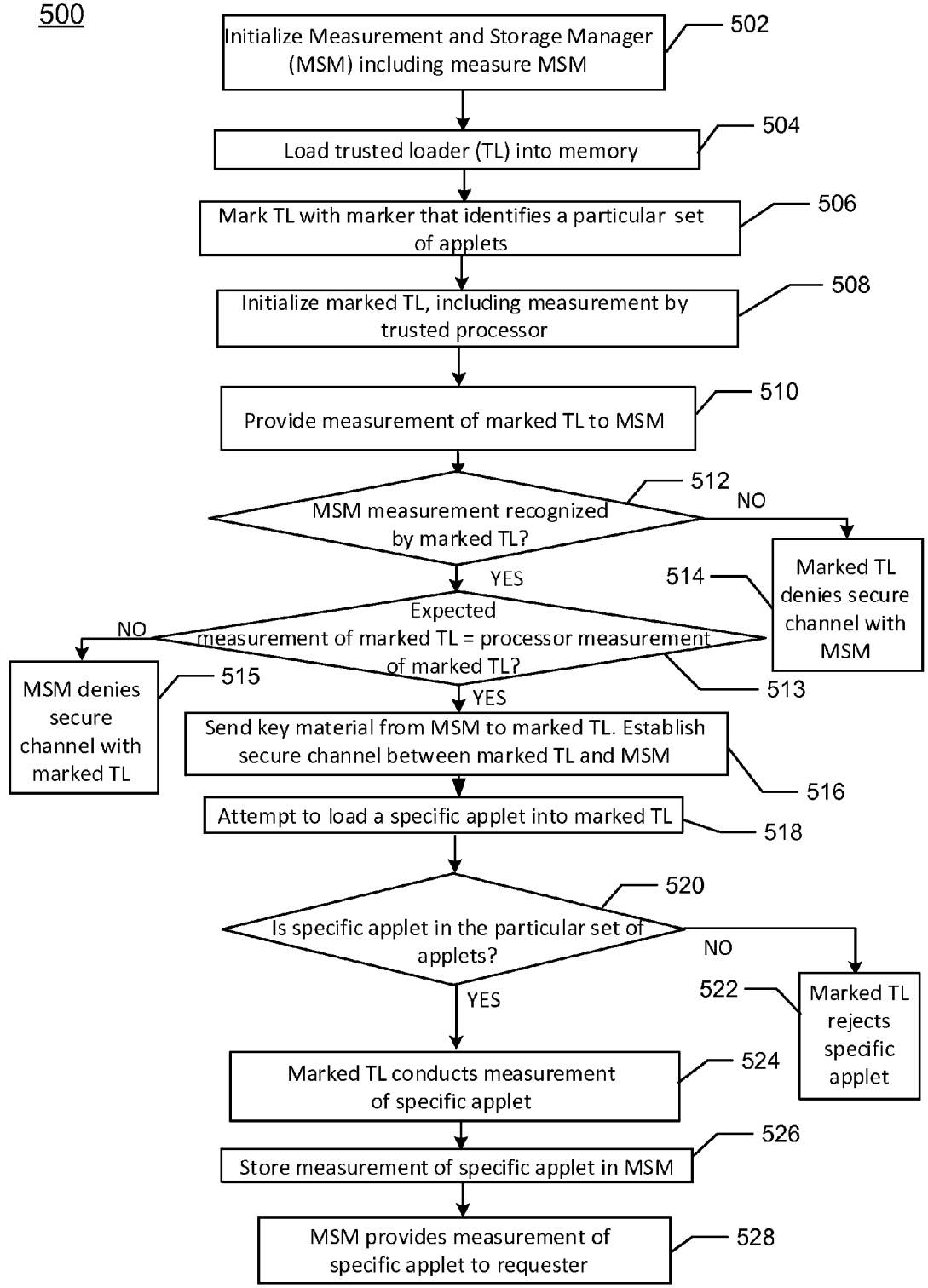
FIG. 5 is a flow diagram of a method, according to another embodiment of the present invention.

FIG. 5 is a flow diagram of a method, according to another embodiment of the present invention. Method 500 begins at block 502, where a measurement and storage manager enclave (MSM) is initialized (e.g., the MSM becomes a secure (e.g., trusted) enclave), and measurement of the MSM is conducted by, e.g., execution of a trusted instruction in a trusted processor using trusted hardware logic, and may include software, firmware, or a combination thereof.

Continuing to block 504, trusted loader code (TL) is loaded into memory. Advancing to block 506, the TL is marked with a marker that identifies a particular set of applets, e.g., the marker may include a corresponding identifier of each applet of the particular set of applets. For example, the identifier of a first applet may be a measurement of the first applet. Moving to block 508, the marked TL is initialized (e.g., becomes a trusted enclave) by the trusted processor and a measurement of the marked TL is conducted, e.g., by the trusted processor. Proceeding to block 510, the measurement of the marked TL is to be provided to the MSM.

Continuing to decision diamond 512, if the MSM measurement is not recognized by the marked TL, advancing to block 514 the marked TL denies establishment of a secure channel with the MSM. If, at decision diamond 512, the MSM measurement is recognized by the marked TL, advancing to decision diamond 513, the MSM performs a comparison of an expected measurement of the marked TL (determined by the MSM by, e.g., conducting a measurement of the marked TL by the MSM) to the processor measurement of the marked TL. If the comparison does not produce a match, proceeding to block 515, the MSM is to deny establishment of the secure channel with the marked TL. If the comparison produces a match between the expected measurement of the marked TL and the processor measurement of the marked TL, advancing to block 516 cryptographic key material is to be sent from the MSM to the marked TL and a secure channel is to be established between the marked TL and the MSM.

Moving to block 518, a specific applet is attempted to be loaded into the marked TL. Proceeding to decision diamond 520, if the marked TL does not recognize the specific applet as being within the particular set of applets, e.g., via comparison with the marker, continuing to block 522 the marked TL rejects the specific applet from being loaded. If, at the decision diamond 520, the marked TL recognizes the specific applet as being within the particular set of applets, e.g., via comparison with the marker, continuing to block 524 the marked TL conducts a measurement of the specific applet. Advancing to block 526, the measurement of the specific applet is to be stored in the MSM. Moving to block 528, responsive to a request, the MSM is to provide the measurement of the specific applet to a requester.

Figure 6:
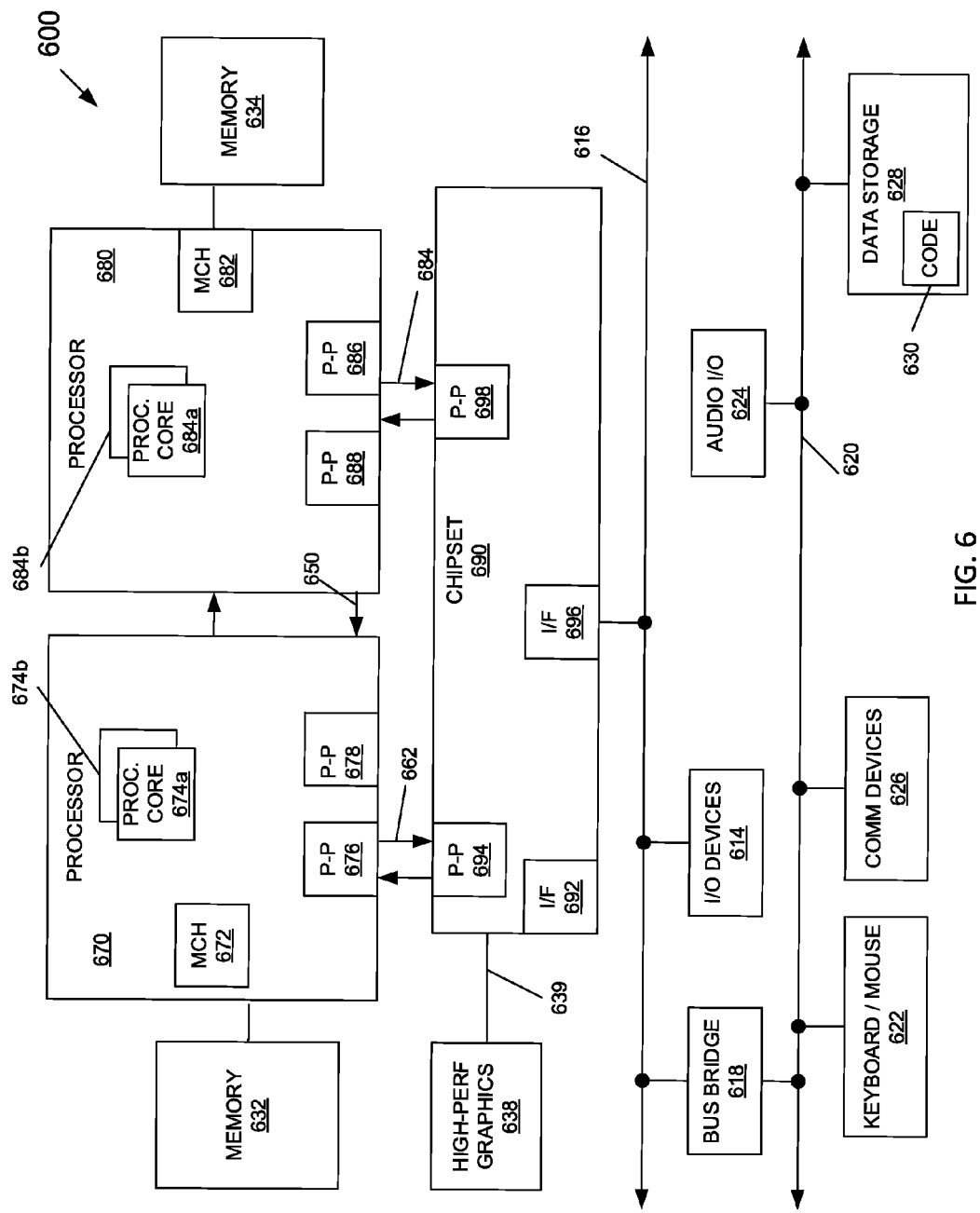
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674*a* and 674*b* and processor cores 684*a* and 684*b*), although potentially many more cores may be present in the processors. Portions of one or both of the processors 670, 680, and portions of memories 632 and/or 634 may be included a trusted execution environment (TEE) and may enable instantiation of one or more trusted loader enclaves (TLs) and establishment of a secure communication channel between a TL and a measurement and storage management enclave (MSM) based upon providing to the MSM a measurement of the TL and providing to the MS a measurement of the TL, and where a TL can receive and store code (e.g., an applet) after the measurement of the TL has been conducted, a measurement of the code can be taken after storing the code in the TL, and the measurement of the code can be sent to be stored in the MSM, according to embodiments of the present invention.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories, namely a memory 632 and a memory 634, which may be portions of system memory (e.g., DRAM) locally attached to the respective processors. The memory 632 and the memory 634 may include a trusted execution environment (TEE) portion including one or more secure enclaves, as in embodiments of the present invention. First processor 670 and second processor 680 may be coupled to a chipset 690 via P-P interconnects 662 and 684, respectively. As shown in FIG. 6, chipset 690 includes P-P interfaces 694 and 698.

Furthermore, chipset 690 includes an interface 692 to couple chipset 690 with a high performance graphics engine 638 via a P-P interconnect 639. In turn, chipset 690 may be coupled to a first bus 616 via an interface 696. As shown in FIG. 6, various input/output (I/O) devices 614 may be coupled to first bus 616, along with a bus bridge 618, which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio input/output (I/O) 624 may be coupled to second bus 620. Embodiments can be incorporated into other types of systems including mobile devices such as a smart cellular telephone, tablet computer, netbook, Ultrabook™, or so forth.

Figure 7:
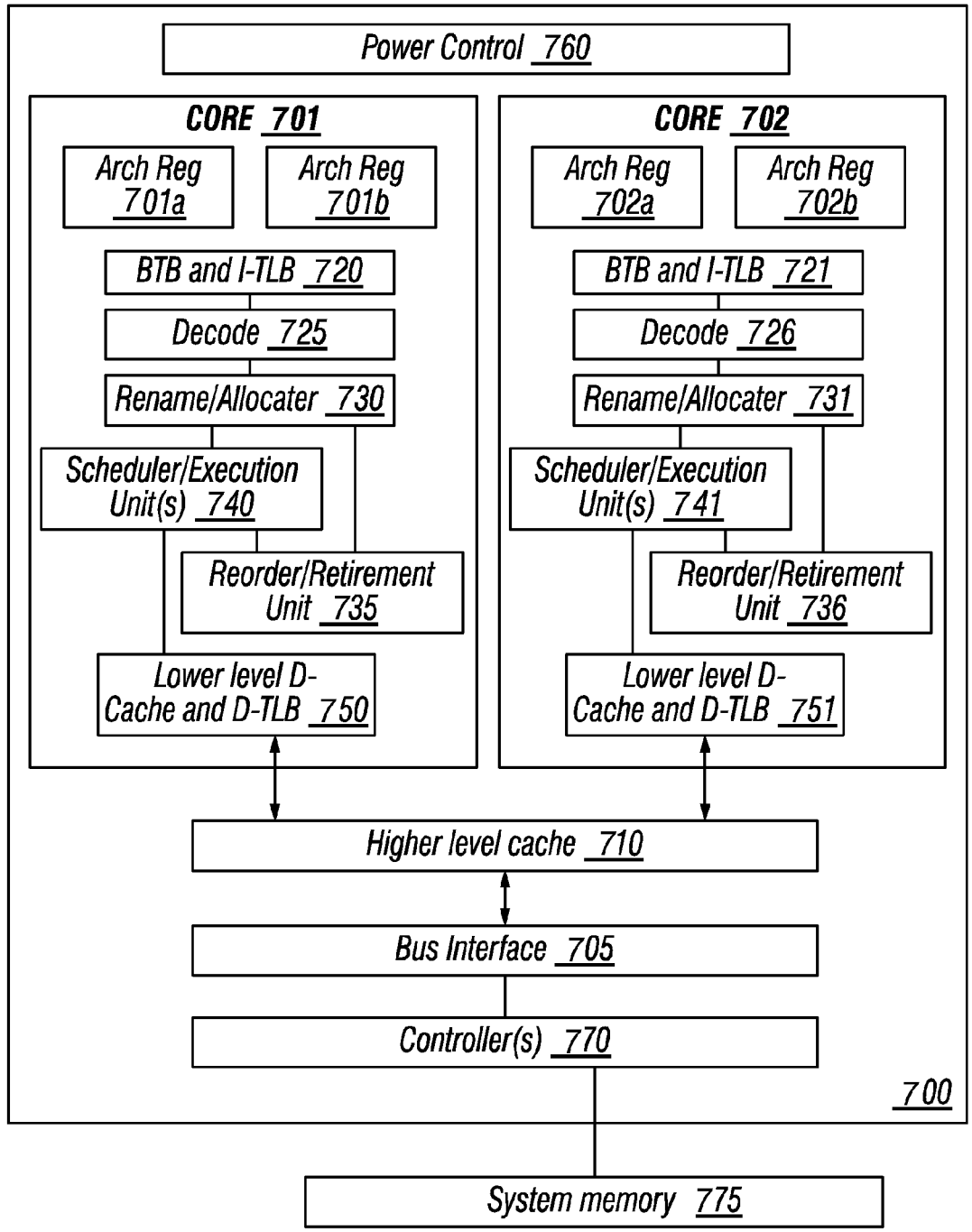
FIG. 7 is a block diagram of a processor that may be utilized in embodiments of the present invention.

FIG. 7 is a block diagram of a processor 700 that may be utilized in embodiments of the present invention. Processor 700 includes cores 701 and 702. Here, cores 701 and 702 are considered cores, i.e., cores with the same configurations, functional units, and/or logic. In another embodiment, core 701 includes an out-of-order processor core, while core 702 includes an in-order processor core. However, cores 701 and 702 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 701 are described in further detail below, as the units in core 702 operate in a similar manner. Either or both of cores 701 and 702 and portions of system memory 775, may be a part of a trusted execution environment that may enable instantiation of one or more trusted loader enclaves (TLs) and establishment of a secure communication channel between a TL and a measurement and storage management secure enclave (MSM) based upon a measurement of the TL and a measurement of the MSM, and where the TL can receive code (e.g., an applet) to be stored after the measurement of the TL is conducted, a measurement of the code can be taken, and the measurement of the code can be sent to the MSM to be provided upon request to a requester, according to embodiments of the present invention.

As depicted, core 701 includes two hardware threads 701a and 701b, which may also be referred to as hardware thread slots 701a and 701b. Therefore, software entities, such as an operating system, in one embodiment potentially view processor 700 as four separate processors, i.e., four logical processors or processing elements capable of executing four software threads concurrently. As alluded to above, a first thread is associated with architecture state registers 701a, a second thread is associated with architecture state registers 701b, a third thread may be associated with architecture state registers 702a, and a fourth thread may be associated with architecture state registers 702b. Here, each of the architecture state registers (701a, 701b, 702a, and 702b) may be referred to as processing elements, thread slots, or thread units, as described above. As illustrated, architecture state registers 701a are replicated in architecture state registers 701b, so individual architecture states/contexts are capable of being stored for logical processor 701a and logical processor 701b. In core 701, other smaller resources, such as instruction pointers and renaming logic in allocator and renamer block 730 may also be replicated for threads 701a and 701b. Some resources, such as re-order buffers in reorder/retirement unit 735, Instruction translation lookaside buffer (ITLB) 720, load/store buffers, and queues may be shared through partitioning. Other resources, such as general purpose internal registers, page-table base register(s), low-level data-cache and data-TLB 715, execution unit(s) 740, and portions of out-of-order unit 735 are potentially fully shared.

Processor 700 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 701 includes a simplified, representative out-of-order (OOO) processor core. But an in-order processor may be utilized in different embodiments. The OOO core includes a branch target buffer 720 to predict branches to be executed/taken and an instruction-translation buffer (I-TLB) 720 to store address translation entries for instructions.

Core 701 further includes decode module 725 coupled to fetch unit 720 to decode fetched elements. Fetch logic, in one embodiment, includes individual sequencers associated with thread slots 701a, 701b, respectively. Usually core 701 is associated with a first ISA, which defines/specifies instructions executable on processor 700. Often machine code instructions that are part of the first ISA include a portion of the instruction (referred to as an opcode), which references/specifies an instruction or operation to be performed. Decode logic 725 includes circuitry that recognizes these instructions from their opcodes and passes the decoded instructions on in the pipeline for processing as defined by the first ISA. For example, decoders 725, in one embodiment, include logic designed or adapted to recognize specific instructions, such as transactional instruction. As a result of the recognition by decoders 725, the architecture or core 701 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 730 includes an allocator to reserve resources, such as register files to store instruction processing results. However, threads 701a and 701b are potentially capable of out-of-order execution, where allocator and renamer block 730 also reserves other resources, such as reorder buffers to track instruction results. Unit 730 may also include a register renamer to rename program/instruction reference registers to other registers internal to processor 700. Reorder/retirement unit 735 includes components, such as the reorder buffers mentioned above, load buffers, and store buffers, to support out-of-order execution and later in-order retirement of instructions executed out-of-order.

Scheduler and execution unit(s) block 740, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 750 are coupled to execution unit(s) 740. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 701 and 702 share access to higher-level or further-out cache 710, which is to cache recently fetched elements. Note that higher-level or further-out refers to cache levels increasing or getting further away from the execution unit(s). In one embodiment, higher-level cache 710 is a last-level data cache—last cache in the memory hierarchy on processor 700—such as a second or third level data cache. However, higher level cache 710 is not so limited, as it may be associated with or includes an instruction cache. A trace cache—a type of instruction cache—instead may be coupled after decoder 725 to store recently decoded traces.

In the depicted configuration, processor 700 also includes bus interface module 705 and a power controller 760, which may perform power management in accordance with an embodiment of the present invention. In this scenario, bus interface 705 is to communicate with devices external to processor 700, such as system memory and other components.

A memory controller 770 may interface with other devices such as one or many memories. In an example, bus interface 705 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 8:
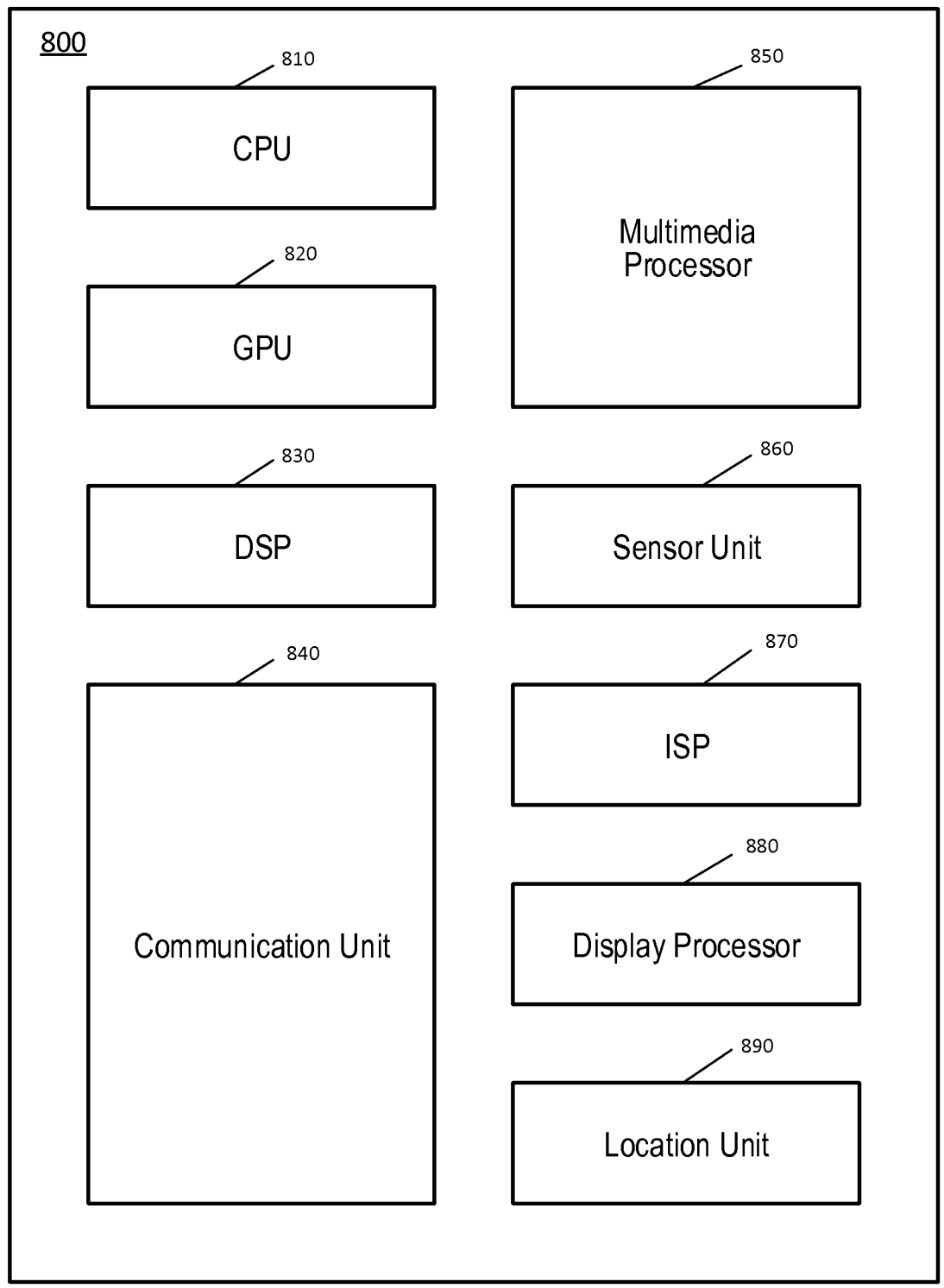
FIG. 8 is a block diagram of a system on a chip (SoC) that may be utilized according to aspects of the present invention.

Referring now to FIG. 8, shown is a block diagram of a system on a chip (SoC) that may be utilized according to aspects of the present invention. In the embodiment of FIG. 8, SoC 800 may include various circuitry to enable high performance for multimedia applications, communications and other functions. As such, SoC 800 is suitable for incorporation into a wide variety of portable and other devices, such as smartphones, tablet computers, smart TVs and so forth. In the example shown, SoC 800 includes a central processor unit (CPU) domain 810. In an embodiment, a plurality of individual processor cores may be present in CPU domain 810. As one example, CPU domain 810 may be a quad core processor having 4 multithreaded cores. Such processors may be homogeneous or heterogeneous processors, e.g., a mix of low power and high power processor cores. The SOC 800 may be part of a trusted execution environment (TEE) and may enable instantiation of one or more trusted loader enclaves (TLs) and establishment of a secure communication channel between a TL and a measurement and storage management secure enclave (MSM) based upon a measurement of the TL sent to the MSM and a measurement of the MSM sent to the TL, where the TL can receive code (e.g., an applet) for storage in the TL after a TL measurement of the TL, a measurement of the code can be taken after storing the code in the TL, and the measurement of the code can be sent to the MSM and may be provided to a requester upon request, according to embodiments of the present invention.

A GPU domain 820 is provided to perform advanced graphics processing in one or more GPUs to handle graphics and compute APIs. A DSP unit 830 may provide one or more low power DSPs for handling low-power multimedia applications such as music playback, audio/video and so forth, in addition to advanced calculations that may occur during execution of multimedia instructions. In turn, a communication unit 840 may include various components to provide connectivity via various wireless protocols, such as cellular communications (including 3G/4G LTE), wireless local area techniques such as Bluetooth™, IEEE 802.11, and so forth.

Still further, a multimedia processor 850 may be used to perform capture and playback of high definition video and audio content, including processing of user gestures. A sensor unit 860 may include a plurality of sensors and/or a sensor controller to interface to various off-chip sensors present in a given platform. An image signal processor 870 may be provided with one or more separate ISPs to perform image processing with regard to captured content from one or more cameras of a platform, including still and video cameras.

A display processor 880 may provide support for connection to a high definition display of a given pixel density, including the ability to wirelessly communicate content for playback on such display. Still further, a location unit 890 may include a GPS receiver with support for multiple GPS constellations to provide applications highly accurate positioning information obtained using as such GPS receiver. Understand that while shown with this particular set of components in the example of FIG. 8, many variations and alternatives are possible.

Additional embodiments are described below.

A $1^{st}$ embodiment includes at least one machine readable medium on which is stored code that, when executed enables a system to initialize a first trusted loader (TL) and a measurement and storage manager (MSM) within a memory of a system; receive by the MSM a first TL measurement of the first TL from a trusted processor of the system; determine whether to establish a secure channel between the MSM and the first TL based at least in part on the first TL measurement; and responsive to a determination to establish the secure channel, establish the secure channel and store first code in the first TL.

A $2^{nd}$ embodiment includes elements of the $1^{st}$ embodiment. Additionally, the code, when executed enables the system to prior to conducting the first TL measurement, associate a first TL marker with the first TL to form a marked first TL, wherein the first TL marker is based on a first TL identifier associated with the first TL; and determine the first TL measurement based on the marked first TL.

A $3^{rd}$ embodiment includes elements of the $2^{nd}$ embodiment. Additionally, the first TL marker is further based on an MSM identifier associated with the MSM.

A $4^{th}$ embodiment includes elements of the $3^{rd}$ embodiment, where the stored code, when executed enables the system to calculate by the MSM, an expected measurement of the first TL based on the first TL and on the first TL marker; conduct, by the MSM, a comparison of the first TL measurement from the trusted processor to the expected measurement of the first TL; and determine, by the MSM, to establish the secure channel when the comparison indicates a match between the first TL measurement and the expected measurement of the first TL, otherwise determine to refrain from establishment of the secure channel.

A $5^{th}$ embodiment includes elements of the $4^{th}$ embodiment, where the stored code, when executed further enables the marked TL to conduct a measurement of the first code and to provide the measurement of the first code from the marked TL to the MSM responsive to the secure channel being established.

A $6^{th}$ embodiment includes elements of the $5^{th}$ embodiment, where the stored code, when executed further enables the system to, responsive to a request, provide the measurement of the first code from the MSM to a requester.

A $7^{th}$ embodiment includes elements of the $6^{th}$ embodiment, where the stored code, when executed further enables the system to: initialize a second TL in the memory; provide from the MSM to the second TL a second TL marker that uniquely identifies the second TL to the MSM, and include the second TL marker in the second TL to form a marked second TL; and perform a measurement of the marked second TL by the trusted processor.

An $8^{th}$ embodiment includes elements of the $7^{th}$ embodiment, where the stored code, when executed further enables the system to determine whether to establish a second secure channel between the MSM and the second TL based at least in part on a comparison by the MSM of an expected measurement of the marked second TL to the measurement of the marked second TL, where the expected measurement of the marked second TL is to be determined by the MSM based on the marked second TL.

A 9$^{th}$ embodiment includes elements of the 8$^{th}$ embodiment, where the stored code, when executed further enables the system to responsive to a determination to establish the second secure channel, load second code into the second TL, perform a measurement of the second code by the marked second TL, provide the measurement of the second code from the marked second TL to the MSM, and responsive to a second request, provide by the MSM the measurement of the second code to a second requester.

A 10$^{th}$ embodiment includes elements of any one of embodiments 1-9, wherein the code, when executed enables the system to conduct by the trusted processor an MSM measurement of the MSM, and provide the MSM measurement to the first TL, where determination of whether the secure channel is to be established further based on the MSM measurement.

An 11$^{th}$ embodiment is a system that includes a processor that includes trusted logic within a core to execute at least one secure instruction to conduct a measurement of a first trusted loader (TL) and initialize the first TL to become a first secure enclave and to conduct a measurement of a storage manager (MSM) and initialize the MSM to become a second secure enclave, and a memory to store the MSM and the first TL, wherein the MSM is to determine whether to establish a first secure channel with the first TL based at least in part on the measurement of the first TL, and if the MSM determines to establish the first secure channel, the first TL is to store first code and to conduct a measurement of the first code, and the MSM is to receive from the first TL the measurement of the first code via the first secure channel after the first secure channel is established.

A 12$^{th}$ embodiment includes elements of the 11$^{th}$ embodiment, where the MSM is further to, prior to conducting the measurement of the first TL and the initialization of the first TL, provide a first marker to the first TL to form a marked first TL, where the MSM is to receive the measurement of the first TL that comprises a measurement of the marked first TL to be conducted by the processor, and the MSM is to determine whether to establish the first secure channel based at least in part on a comparison of an expected measurement of the marked first TL to the measurement of the marked first TL, where the expected measurement of the marked first TL is to be determined based on the marked first TL.

A 13$^{th}$ embodiment includes elements of the 12$^{th}$ embodiment, where when the comparison indicates a match the MSM is to establish the first secure channel, and when the comparison indicates a difference between the calculated measurement of the marked first TL and the measurement of the marked first TL the MSM is to refrain from establishment of the secure channel.

A 14$^{th}$ embodiment includes elements of the 11$^{th}$ embodiment, where the processor is further to create a second TL to be included in the secure memory portion, the second TL is to receive a second marker from the first MSM that is to uniquely identify the second TL to the MSM, the second TL is to include the second marker to form a marked second TL, and the processor is to perform a measurement of the marked second TL.

A 15$^{th}$ embodiment includes elements of the 14$^{th}$ embodiment, where the MSM is to determine whether to establish a second secure channel with the marked second TL based at least in part on a comparison of an expected measurement of the marked second TL determined by the MSM, to the measurement of the marked second TL, where the expected measurement of the marked second TL is to be determined based on the second marker and on the second TL.

A 16$^{th}$ embodiment includes elements of the 15$^{th}$ embodiment, where responsive to a determination to establish the second secure channel with the marked second TL, the second TL is to load second code into the second TL and to perform a measurement of the second code.

A 17$^{th}$ embodiment includes elements of the 16$^{th}$ embodiment, where after the second secure channel is established the measurement of the second code is to be provided to the MSM, and responsive to a second request the measurement of the second code is to be provided to a second requester.

An 18$^{th}$ embodiment is a method that includes instantiating in a memory a measurement and storage manager secure enclave (MSM) and at least one trusted loader secure enclave (TL) that includes a first TL; performing a measurement of the first TL via a secure processor that includes at least one trusted core that is to include trusted logic, and providing the measurement of the first TL to the MSM; and determining whether to establish a secure channel between the first TL and the MSM based at least in part on the measurement of the first TL.

A 19$^{th}$ embodiment includes elements of the 18$^{th}$ embodiment, and further includes generating by the MSM a first TL marker to be associated with the first TL, wherein the first TL marker is to identify the first TL from among the at least one TL and the first TL marker is further to indicate that the first TL is to be bound to the MSM, and associating the first TL marker with the first TL to form a marked first TL; conducting by the secure processor, the measurement of the first TL to include a measurement of the marked first TL, where a determination of whether to establish the secure channel is to be based on a comparison of the measurement of the marked first TL to an expected measurement of the marked first TL, the expected measurement of the marked first TL to be determined based on the marked first TL; and when the comparison indicates that the expected measurement of the marked first TL matches the measurement of the marked first TL, establishing the secure channel.

A 20$^{th}$ embodiment includes elements of the 19$^{th}$ embodiment, further including storing first code in the first TL and performing a measurement of the first code, and responsive to establishment of the secure channel, storing the measurement of the first code in the MSM, where the measurement of the first code is to be provided to a requester responsive to a request from the requester.

A 21$^{st}$ embodiment includes elements of the 19$^{th}$ embodiment, where the secure channel is to be established further responsive to an evaluation of the measurement of the MSM by the first TL.

A 22$^{nd}$ embodiment includes elements of the 19$^{th}$ embodiment, where the expected measurement includes a measurement of the marked TL to be conducted by the MSM.

A 23$^{rd}$ embodiment is an apparatus to perform the method of any one of embodiments 18-22.

A 24th embodiment is an apparatus that includes means for performing the method of any one of embodiments 18-22.

A 25$^{th}$ embodiment is a method that includes: storing in a memory, trusted loader code and measurement and storage manager code; including in the trusted loader code an applet marker that includes an identifier of each applet of a set of applets, to form marked trusted loader code; initializing the marked trusted loader code, wherein initialization includes measuring the marked trusted loader code and forming a trusted loader secure enclave (TL) that includes the marked trusted loader code; initializing the measurement and storage manager code, wherein initialization includes measuring the measurement and storage manager code and forming a measurement and storage manager secure enclave (MSM) that includes the measurement and storage manager code; determining, by the TL, whether to load a first applet into the TL based on a comparison of a first identifier associated with the first applet, to the applet marker; and if the TL determines to load the first applet, loading the first applet into the TL and measuring the first applet by the TL.

A 26$^{th}$ embodiment includes elements of the 25$^{th}$ embodiment, further including determining by the TL whether to establish a secure channel with the MSM based on the measurement of the MSM.

A 27$^{th}$ embodiment includes elements of the 25$^{th}$ embodiment, further including determining by the MSM whether to establish the secure channel with the TL based on a comparison of an expected measurement of the TL to a measurement of the TL conducted by a trusted processor.

A 28$^{th}$ embodiment includes elements of the 27$^{th}$ embodiment, where the expected measurement of the TL includes a measurement of the TL to be conducted by the MSM.

A 29$^{th}$ embodiment includes elements of the 27$^{th}$ embodiment, further including, when the TL and the MSM determine to establish the secure channel, establishing the secure channel, where establishment of the secure channel includes sending cryptographic key material from the MSM to the TL.

A 30$^{th}$ embodiment includes elements of the 29$^{th}$ embodiment, further including after the secure channel is established, providing a measurement of the first applet from the TL to the MSM.

A 31$^{st}$ embodiment includes elements of the 30$^{th}$ embodiment, further including when the measurement of the first applet is provided to the MSM, storing the measurement of the first applet in the MSM and providing the measurement of the first applet to a requester responsive to a request from the requester.

A 32$^{nd}$ embodiment includes elements of the 25$^{th}$ embodiment, further including storing the measurement of the TL in the MSM.

A 33$^{rd}$ embodiment includes elements of the 25$^{th}$ embodiment, where the comparison includes determining whether the first identifier is included in the applet marker.

A 34$^{th}$ embodiment includes elements of the 33$^{rd}$ embodiment, further including when the first identifier is not included in the applet marker, refusing, by the TL, to load the first applet into the TL.

A 35$^{th}$ embodiment is an apparatus to perform the method of any one of embodiments 25-34.

A 36$^{th}$ embodiment is an apparatus that includes means for performing the method of any one of elements 25-34.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory machine readable medium on which is stored code that, when executed enables a system to:
   initialize a first trusted loader (TL) within a trusted region of a memory of the system and initialize a measurement and storage manager (MSM) within the trusted region of the memory of the system;
   associate a first TL marker with the first TL to form a marked first TL, wherein the first TL marker is based on a first TL identifier associated with the first TL to bind the first TL to the MSM;
   receive by the MSM a first TL measurement of the marked first TL from a trusted processor of the system, the trusted processor to determine the first TL measurement based on contents of the marked first TL;
   determine whether to establish a secure channel between the MSM and the first TL based at least in part on the first TL measurement;
   responsive to a determination to establish the secure channel, establish the secure channel and store first code in the first TL after the first TL measurement, including to transfer cryptographic key material from the MSM to the first TL, the first code comprising an applet having arbitrary code;
   conduct by the marked first TL a measurement of the first code and provide the measurement of the first code from the marked first TL to the MSM responsive to the secure channel being established; and
   responsive to a request, provide the measurement of the first code from the MSM to a requester.

2. The at least one non-transitory machine readable medium of claim 1, wherein the first TL marker is further based on an MSM identifier associated with the MSM.

3. The at least one non-transitory machine readable medium of claim 2, wherein the stored code, when executed enables the system to:
   calculate by the MSM, an expected measurement of the first TL based on the first TL and on the first TL marker;
   conduct, by the MSM, a comparison of the first TL measurement from the trusted processor to the expected measurement of the first TL; and determine, by the MSM, to establish the secure channel when the comparison indicates a match between the first TL measurement and the expected measurement of the first TL, otherwise determine to refrain from establishment of the secure channel.

4. The at least one non-transitory machine readable medium of claim 1, wherein the stored code, when executed further enables the system to:
  initialize a second TL within the trusted region of the memory;
  provide from the MSM to the second TL a second TL marker that uniquely identifies the second TL to the MSM, and include the second TL marker in the second TL to form a marked second TL; and
  perform a measurement of the marked second TL by the trusted processor.

5. The at least one non-transitory machine readable medium of claim 4, wherein the stored code, when executed further enables the system to determine whether to establish a second secure channel between the MSM and the second TL based at least in part on a comparison by the MSM of an expected measurement of the marked second TL to the measurement of the marked second TL, wherein the expected measurement of the marked second TL is to be determined by the MSM based on the marked second TL.

6. The at least one non-transitory machine readable medium of claim 5, wherein the stored code, when executed further enables the system to:
  responsive to a determination to establish the second secure channel, load second code into the second TL, perform a measurement of the second code by the marked second TL, provide the measurement of the second code from the marked second TL to the MSM, and responsive to a second request, provide by the MSM the measurement of the second code to a second requester.

7. The at least one non-transitory machine readable medium of claim 1, wherein the code, when executed enables the system to:
  conduct by the trusted processor an MSM measurement of the MSM; and
  provide the MSM measurement to the first TL, wherein determination of whether the secure channel is to be established is further based on the MSM measurement.

8. A system comprising:
  a processor that includes trusted logic within a core to execute at least one secure instruction to provide a first marker to a first trusted loader (TL) to bind the first TL to a storage manager (MSM) and conduct a measurement of the marked first TL based on contents of the marked first TL and initialize the first TL to become a first secure enclave and to conduct a measurement of a MSM and initialize the MSM to become a second secure enclave; and
  a memory to store the MSM and the first TL, wherein the MSM is to determine whether to establish a first secure channel with the first TL based at least in part on the measurement of the marked first TL, and if the MSM determines to establish the first secure channel, the first TL is to store first code comprising an applet having arbitrary code in the first TL and to conduct a measurement of the first code, and the MSM is to receive from the first TL the measurement of the first code via the first secure channel after the first secure channel is established, and responsive to a request, provide the measurement of the first code from the MSM to a requester.

9. The system of claim 8, wherein the MSM is to determine whether to establish the first secure channel based at least in part on a comparison of an expected measurement of the marked first TL to the measurement of the marked first TL, wherein the expected measurement of the marked first TL is to be determined based on the marked first TL.

10. The system of claim 9, wherein when the comparison indicates a match the MSM is to establish the first secure channel, and when the comparison indicates a difference between the calculated measurement of the marked first TL and the measurement of the marked first TL the MSM is to refrain from establishment of the secure channel.

11. The system of claim 8, wherein the processor is further to create a second TL to be included in the secure memory portion, the second TL is to receive a second marker from the MSM that is to uniquely identify the second TL to the MSM, the second TL is to include the second marker to form a marked second TL, and the processor is to perform a measurement of the marked second TL.

12. The system of claim 11, wherein the MSM is to determine whether to establish a second secure channel with the marked second TL based at least in part on a comparison of an expected measurement of the marked second TL determined by the MSM, to the measurement of the marked second TL, wherein the expected measurement of the marked second TL is to be determined based on the second marker and on the second TL.

13. The system of claim 12, wherein responsive to a determination to establish the second secure channel with the marked second TL, the second TL is to load second code into the second TL and to perform a measurement of the second code.

14. The system of claim 13, wherein after the second secure channel is established the measurement of the second code is to be provided to the MSM, and responsive to a second request the measurement of the second code is to be provided to a second requester.

15. A method comprising:
  instantiating in a memory a measurement and storage manager secure enclave (MSM) and instantiating in the memory at least one trusted loader secure enclave (TL) that includes a first TL;
  generating by the MSM a first TL marker to be associated with the first TL, wherein the first TL marker is to identify the first TL from among the at least one TL and the first TL marker is further to indicate that the first TL is to be bound to the MSM; and
  associating the first TL marker with the first TL to form a marked first TL;
  performing a measurement of the marked first TL based on contents of the marked first TL via a secure processor that includes at least one trusted core that is to include trusted logic, and providing the measurement of the marked first TL to the MSM;
  determining whether to establish a secure channel between the first TL and the MSM based at least in part on the measurement of the first TL;
  after determining to establish the secure channel, storing first code in the first TL and performing a measurement of the first code, the first code comprises an applet having arbitrary code; and
  responsive to establishment of the secure channel, storing the measurement of the first code in the MSM, wherein the measurement of the first code is to be provided to a requester responsive to a request from the requester.

16. The method of claim 15, further comprising:

conducting by the secure processor, the measurement of the first TL comprising a measurement of the marked first TL, wherein a determination of whether to establish the secure channel is to be based on a comparison of the measurement of the marked first TL to an expected measurement of the marked first TL, the expected measurement of the marked first TL to be determined based on the marked first TL; and when the comparison indicates that the expected measurement of the marked first TL matches the measurement of the marked first TL, establishing the secure channel.

\* \* \* \* \*